United States Patent
Browne

(10) Patent No.: US 7,919,575 B2
(45) Date of Patent: Apr. 5, 2011

(54) STARTER FEED STREAM ACIDIFICATION IN DMC-CATALYZED PROCESS

(75) Inventor: Edward Browne, South Charleston, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 12/786,628

(22) Filed: May 25, 2010

(65) Prior Publication Data

US 2010/0234647 A1    Sep. 16, 2010

Related U.S. Application Data

(63) Continuation of application No. 10/804,894, filed on Mar. 19, 2004, now abandoned.

(51) Int. Cl.
*C08G 65/34* (2006.01)
*C07C 43/00* (2006.01)

(52) U.S. Cl. ........ 528/425; 568/620; 568/621; 568/679; 568/680

(58) Field of Classification Search .................. 528/425; 568/620, 621, 679, 680
See application file for complete search history.

(56) References Cited

U.S. PATENT DOCUMENTS

| | | | |
|---|---|---|---|
| 3,404,109 A | 10/1968 | Milgrom | |
| 3,427,256 A | 2/1969 | Milgrom | |
| 3,427,334 A | 2/1969 | Belner | |
| 3,427,335 A | 2/1969 | Herold | |
| 3,538,043 A | 11/1970 | Herold | |
| 3,829,500 A | 8/1974 | Crowley | |
| 3,829,505 A | 8/1974 | Herold | |
| 4,472,560 A | 9/1984 | Kuyper et al. | |
| 4,477,589 A | 10/1984 | van der Hulst et al. | |
| 5,145,883 A | 9/1992 | Saito et al. | |
| 5,158,922 A | 10/1992 | Hinney et al. | |
| 5,470,813 A | 11/1995 | Le-Khac | |
| 5,482,908 A | 1/1996 | Le-Khac | |
| 5,545,601 A | 8/1996 | Le-Khac | |
| 5,689,012 A | 11/1997 | Pazos et al. | |
| 5,777,177 A | 7/1998 | Pazos | |
| 6,028,230 A * | 2/2000 | Le-Khac et al. | 568/679 |
| 6,063,897 A * | 5/2000 | Le-Khac et al. | 528/410 |
| 6,077,978 A | 6/2000 | McDaniel et al. | |
| 6,359,101 B1 * | 3/2002 | O'Connor et al. | 528/66 |
| 6,689,710 B2 | 2/2004 | Grosch et al. | |
| 2002/0198099 A1 | 12/2002 | Ooms et al. | |
| 2004/0044240 A1 | 3/2004 | Grosch et al. | |
| 2005/0209438 A1 * | 9/2005 | Browne | 528/414 |
| 2008/0021191 A1 * | 1/2008 | Reese et al. | 528/44 |

FOREIGN PATENT DOCUMENTS

DE    10001779    7/2001
JP    2005-272838 A  * 10/2005

OTHER PUBLICATIONS

Machine translation of JP 2005-272838 A, provided by the JPO website (no date).*

* cited by examiner

*Primary Examiner* — Michael J Feely
(74) *Attorney, Agent, or Firm* — N. Denise Brown; Noland J. Cheung

(57) ABSTRACT

The process of the present invention provides for the manufacture of lower molecular weight DMC-catalyzed polyols than is possible using non-acidified continuous addition of starter (CAOS) feeds, by adding excess acid to a starter feed stream over that required for mere neutralization of the basicity of the starter. The benefits of the invention also extend to starters which do not contain basicity. Polyether polyols made by the inventive process may be used to produce improved polyurethane products such as coatings, adhesives, sealants, elastomers, foams and the like.

17 Claims, No Drawings

US 7,919,575 B2

STARTER FEED STREAM ACIDIFICATION IN DMC-CATALYZED PROCESS

This is a Continuation of U.S. Ser. No. 10/804,894 filed Mar. 19, 2004, now abandoned.

FIELD OF THE INVENTION

The present invention relates in general to catalysis, and more specifically, to the acidification of starter feed stream(s) in a continuous addition of starter (CAOS) polyether polyol production process to improve double metal cyanide ("DMC") catalyst activity.

BACKGROUND OF THE INVENTION

Base-catalyzed oxyalkylation has been used to prepare polyoxyalkylene polyols for many years. In such a process, a suitably hydric low molecular weight starter molecule, such as propylene glycol or glycerine, is oxyalkylated with one or more alkylene oxides; such as ethylene oxide or propylene oxide, to form a polyoxyalkylene polyether polyol product. Because it is possible to employ a low molecular weight starter, the build ratio (polyol weight/starter weight) is relatively high, and thus the process effectively utilizes reactor capacity. Strongly basic catalysts such as sodium hydroxide or potassium hydroxide are typically used in such oxyalkylations.

Thus, most of polyoxyalkylene polyols useful in synthesis of polyurethane polymers, as well as those suitable for other uses, contain substantial amounts of oxypropylene moieties. As those skilled in the art are aware, during base-catalyzed oxypropylation, a competing rearrangement of propylene oxide to allyl alcohol generates monofunctional species which also become oxyalkylated, producing a wide range of polyoxyalkylene monols with molecular weights ranging from that of allyl alcohol itself or its low molecular weight oxyalkylated oligomers to polyether monols of very high molecular weight. In addition to broadening the molecular weight distribution of the product, the continuous generation of monols lowers the product functionality. For example, a polyoxypropylene diol or triol of 2,000 Da equivalent weight may contain from 30 to 40 mole percent monol. The monol content lowers the functionality of the polyoxypropylene diols produced from their "nominal" or "theoretical" functionality of 2.0 to "actual" functionalities in the range of 1.6 to 1.7. In the case of triols, the functionality may range from 2.2 to 2.4. As the oxypropylation proceeds further, the functionality continues to decrease, and the molecular weight growth rate slows. For these reasons, the upper practical limit for base-catalyzed polyoxypropylene polyol equivalent weight is just above 2,000 Da. Even at those modest equivalent weights, the products are characterized by low actual functionality and broad molecular weight distribution.

The monol content of polyoxyalkylene polyols is generally determined by measuring the unsaturation, for example by ASTM D-2849-69, "Testing of Urethane Foam Polyol Raw Materials", as each monol molecule contains allylic termination. Levels of unsaturation of about 0.060 meq/g to in excess of 0.10 meq/g for based-catalyzed polyols such as those described above are generally obtained. Numerous attempts have been made to lower unsaturation, and hence monol content, but few have been successful.

In the early 1960's, double metal cyanide ("DMC") complexes, such as the non-stoichiometric glyme complexes of zinc hexacyanocobaltate, were found which were able to prepare polyoxypropylene polyols with low monol contents, as reflected by unsaturation in the range of 0.018 to 0.020 meq/g. This represented a considerable improvement over the monol content obtainable by base catalysis.

In the 1970's, General Tire & Rubber Company, in U.S. Pat. No. 3,829,505, described the preparation of high molecular weight diols, triols etc., using double metal cyanide catalysts. However, the catalyst activity, coupled with catalyst cost and the difficulty of removing catalyst residues from the polyol product, prevented commercialization of the products.

In the 1980's, interest in such catalysts resurfaced, and improved catalysts with higher activity coupled with improved methods of catalyst removal allowed commercialization for a short time. The polyols also exhibited somewhat lower monol content, as reflected by unsaturations in the range of 0.015 to 0.018 meq/g. However, the economics of the process were marginal, and in many cases, improvements expected in polymer products due to higher functionality and higher polyol molecular weight did not materialize.

In the 1990's, DMC catalysts were developed with far greater activity than was theretofore possible. Those catalysts, described for example in U.S. Pat. Nos. 5,470,813 and 5,482,908, allowed commercialization of DMC-catalyzed polyether polyols by ARCO Chemical Company under the ACCLAIM tradename. Unlike the low unsaturation (0.015-0.018 meq/g) polyols prepared by prior DMC catalysts, these ultra-low unsaturation polyols often demonstrated dramatic improvements in polymer properties, although formulations were often different from the formulations useful with conventional polyols. These polyols typically have unsaturation in the range of 0.002 to 0.008 meq/g.

As those skilled in the art appreciate, one drawback of DMC-catalyzed oxyalkylation is the difficulty of using low molecular weight starters in polyether synthesis. Polyoxyalkylation of low molecular weight starters is generally sluggish, and often accompanied by catalyst deactivation. Thus, rather than employing low molecular weight starter molecules directly, oligomeric starters are prepared in a separate process by base-catalyzed oxypropylation of a low molecular weight starter to equivalent weights in the range of 200 Da to 700 Da or higher. Further oxyalkylation to the target molecular weight takes place in the presence of DMC catalysts. However, it is known to those skilled in the art that strong bases deactivate DMC catalysts. Thus, the basic catalyst used in oligomeric starter preparation must be removed by methods such as neutralization, adsorption, ion exchange, and the like. Several such methods require prolonged filtration of viscous polyol. The additional steps associated with catalyst removal from the oligomeric starter can add significant process time, and thus cost, to the overall process. Furthermore, the higher molecular weight of the starter lowers the build ratio of the process significantly, thereby decreasing reactor utilization.

Another drawback associated with oxyalkylation with DMC catalysts is that a very high molecular weight component is generally observed. The bulk of DMC-catalyzed polyol product molecules are contained in a relatively narrow molecular weight band, and thus DMC-catalyzed polyols exhibit very low polydispersities, generally 1.20 or less. However, it has been determined that a very small fraction of molecules, i.e., less than 1,000 ppm, have molecular weights in excess of 100,000 Da. This very small, but very high molecular weight, fraction is thought to be responsible for some of the anomalous properties observed with ultra-low unsaturation, high functionality polyols. These ultra high molecular weight molecules do not significantly alter the polydispersity, however, due to the extremely small amounts present.

U.S. Pat. Nos. 5,777,177 and 5,689,012, disclose that the high molecular weight "tail" in polyoxypropylene polyols may be minimized by continuous addition of starter ("CAOS") during oxyalkylation. In batch and semi-batch processes, low molecular weight starter, e.g., propylene glycol or dipropylene glycol, is added continuously as the polyoxyalkylation proceeds rather than all being added at the onset. The continued presence of low molecular weight species has been found to lower the amount of high molecular weight tail produced, while also increasing the build ratio, because a large proportion of the final polyol product is derived from low molecular weight starter itself. Surprisingly, the polydispersity remains low, contrary to an expected large broadening of molecular weight distribution. In the continuous addition process, continuous addition of starter during continuous rather than batch production was found to also result in less low molecular weight tail, while allowing a build ratio which approaches that formerly obtainable only by traditional semi-batch processing employing base catalysis.

Unfortunately, when glycerine, a widely used trifunctional starter, is employed in either the batch-type continuous addition of starter process, or the continuous-type continuous addition of starter process, the DMC catalyst gradually deactivates, and often a polyether of the desired molecular weight cannot be obtained, or when obtained, product characteristics such as amount of high molecular weight tail, polydispersity, etc., are less than optimal. It appears that in the low molecular weight range of about 260 to 2500, where the ratio of glycerin to propylene oxide is higher than it is when making high molecular weight polyols, glycerin and other low molecular weight starters can act as inhibitors and stress the catalyst. Any other effects may be more evident under these stressed conditions. Because glycerine is derived from plant or animal matter by base-dependent processes, it contains one or more basic contaminants which may cause a loss of DMC catalyst activity. McDaniel et al., recognize this and teach in U.S. Pat. No. 6,077,978, the addition of very small amounts (i.e., up to about 100 ppm) of acid to the glycerine initiator prior to its introduction into the reactor as continuously added starter to neutralize the basic contaminants. Synthetic glycerin may have trace residues of base from the manufacturing process. Methods said to be useful other than the addition of acid, according to the '978 patent, include adsorption by acid adsorbents, and ion-exchange to either neutralize the impurities or to exchange them for acidic moieties. The addition of acid, however, is the preferred method of McDaniel et al. for increasing the DMC catalyst's ability to resist deactivation during CAOS feeds at high CAOS/oxide ratios. The '978 patent states at col. 6, lines 55-58, that, "... less than 100 ppm acid based on total low molecular weight starter need be added, preferably about 5 ppm to 50 ppm, and most preferably about 10 ppm to 30 ppm" should be used. McDaniel et al. fail to provide any teaching or suggestion to add greater amounts of acid than that needed to neutralize basic contaminants of the glycerine.

It would be desirable to be able to utilize low molecular weight starter molecules for low molecular weight polyol production using DMC catalysis. It would further be desirable to prepare DMC-catalyzed polyols with minimal high molecular weight tail components. It would be further desirable to prepare polyoxyalkylation polyols in high build ratios. However, these objectives cannot be met if catalyst deactivation occurs.

SUMMARY OF THE INVENTION

Accordingly, the present invention provides a process for the manufacture of lower molecular weight DMC-catalyzed polyols than was heretofore possible using non-acidified continuous addition of starter (CAOS) feeds. An excess of acid over that required for neutralization of the basicity of a low molecular weight starter is added to a CAOS feed stream. The inventive process may permit the use of less catalyst for a given process than was heretofore required. The polyether polyols provided by the process of the present invention may allow for the production of improved polyurethane products, such as coatings, adhesives, elastomers, sealants, foams and the like.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention adds an excess of acid to a continuous addition of starter (CAOS) feed stream over that required for neutralization of the basicity of a low molecular weight starter. It had heretofore been thought that the addition of excess acid would have, at best no effect, and at worst a negative effect, as experiments in which DMC catalyst is exposed to phosphoric acid in glycerine during storage showed a marked decrease in catalyst activity over time. The inventive process unexpectedly allows manufacture of lower molecular weight DMC-catalyzed polyols (250 Da to 2,500 Da) than is possible using non-acidified CAOS feeds. The present invention may also permit the use of less catalyst for a given process than heretofore required. Glycerin and other low molecular weight starters can act as inhibitors and stress the catalyst. The acid addition has a positive effect allowing the reaction to proceed to completion. This positive effect is unexpectedly observed even with starters having little or no basicity.

The present invention, therefore, provides a process for the polyoxyalkylation of a low molecular weight starter involving establishing oxyalkylation conditions in an oxyalkylation reactor in the presence of a double metal cyanide catalyst, continuously introducing into the reactor at least one alkylene oxide and a low molecular weight starter acidified with at least one of an inorganic protic mineral acid and an organic acid, wherein the acid is in an amount in excess of 100 ppm, based on the weight of the low molecular weight starter and recovering an oxyalkylated low molecular weight starter polyether product. The process may be conducted as a semi-batch process or as a continuous addition process. In either case, the low molecular weight starter feed stream, is acidified over and above the level of basic impurities found in the starter. The present invention is also directed to the polyol made by the inventive process and polyurethane products incorporating those polyols.

As used herein, the term "continuous" means a mode of addition of a relevant reactant in such a manner so as to maintain an effective concentration of the reactant substantially continuously. Continuous starter addition, for example, may be truly continuous, or may be in relatively closely spaced increments. It would not detract from the present process to incrementally add a reactant in such a manner that the added material's concentration decreases to essentially zero for some time prior to the next incremental addition. However, it is preferred that the amount of catalyst be maintained at substantially the same level, although the concentration will change as the alkylene oxide and starter are charged to the reactor, during the course of the continuous reaction. Incremental addition of reactant which does not substantially affect the nature of the product is still "continuous" as that term is used herein.

In the inventive process, polyoxyalkylene polyols are prepared by the oxyalkylation of a low molecular weight starter, in the presence of a double metal cyanide complex catalyst. In conventional batch processes employing DMC catalysts, the entire initiator (starter) is added initially to the reactor, DMC catalyst is added, and a small percentage of the alkylene oxide feed is added. A significant pressure drop indicates that the catalyst has been activated. Alternatively, a preactivated master batch of catalyst mixed with initiator may be used. The reactor temperature is maintained at between 70° C. and 150° C., and the remainder of propylene oxide added at relatively low pressure, i.e., less than 10 psig. In the conventional process, oligomeric starters having an equivalent weight in the range of 200-700 Da or higher are generally used.

Using the conventional process, by way of example, the preparation of a 3,000 Da molecular weight polyoxypropylated glycerine triol may be achieved through oxypropylation of a 1,500 Da molecular weight oligomeric oxypropylated glycerine starter until a molecular weight of 3,000 Da is achieved. The build ratio is 3,000 Da/1,500 Da or 2.0. This low build ratio cannot efficiently take advantage of reactor capacity, as some 40 percent of the total reactor capacity is used for starter alone. In addition, the product will have a small, but significant amount of a very high molecular weight (>100,000 Da) fraction. This high molecular weight fraction ("tail") is believed to contribute to foam collapse in some polyurethane systems.

In the typical continuous addition of starter ("CAOS") process, polyoxyalkylation is accomplished by addition of a smaller amount of oligomeric starter together with catalyst and initial alkylene oxide for activation as in the conventional process. However, in the continuous addition of starter process, low molecular weight starter is added in addition to alkylene oxide, preferably as a mixed reactor feed stream. The amount may be 1.8 weight percent based on the weight of the combined low molecular weight starter/alkylene oxide stream, as a non-limiting example. As a result of the use of lesser amounts of oligomeric starter and continuous introduction of low molecular weight "monomeric" starter, a glycerine polyol of 3,000 Da molecular weight may be prepared at higher build ratios, for example, a build ratio of 5. The process efficiency is increased by approximately 100 percent based on propylene oxide usage. The product also exhibits less high molecular weight tail.

The typical CAOS process described above works well when making high molecular weight polyols (e.g. greater than 2500 Da), however, when making lower molecular weight polyols (in the range of 250 to 2500 Da), the catalyst often partially or fully deactivates, particularly where glycerine a common trihydric starter is used in the CAOS process. This is shown by an increase in propylene oxide pressure in the reactor. The reaction slows or substantially ceases, and the product may not reach the desired molecular weight. Products are found to have broad polydispersities and a relatively higher amount of high molecular weight tail.

It has now been surprisingly discovered that addition of an excess amount of acid, i.e., an amount greater than that needed to merely neutralize the low molecular weight starter's basicity, to the starter prior to its introduction into the reactor as continuously added starter allows use of low molecular weight starter(s) to produce polyols of low molecular weight (250 Da to 2,500 Da) without catalyst deactivation, without increasing the amount of high molecular weight tail and without appreciably increasing polyol polydispersity.

Low molecular weight starters useful in the inventive process include those having molecular weights below 400 Da, more preferably below 300 Da, which contain basic, DMC catalyst-deactivating impurities. Non-limiting examples of such low molecular weight starter molecules include glycerine, diglycerol, and polyglycerol, all of which are generally prepared through the use of strong bases. Glycerine is generally obtained by the hydrolysis, or "saponification" of triglycerides, while diglycerol and polyglycerol may be obtained by base-catalyzed condensation of glycerine. Further examples of suitable low molecular weight starter molecules include various methylolated phenols and similar products prepared by the base-catalyzed reaction of formaldehyde with urea, phenol, cresol, and the like. The beneficial effects of the invention unexpectedly extend as well to starter molecules which do not contain basicity, e.g., ethylene glycol, propylene glycol, dipropylene glycol, trimethylolpropane, pentaerythritol, sorbitol, sucrose, and the like.

The low molecular weight starter may be mixed with other starters as well, e.g., ethylene glycol, propylene glycol, dipropylene glycol, trimethylolpropane, pentaerythritol, sorbitol, sucrose, and the like, to produce co-initiated polyether polyols. Reactions where another starter or a lower oligomer are added all at once to the reactor is not a "continuous addition of starter" process. However, it must be understood that a final portion of oxyalkylation may, if desired, be conducted without addition of low molecular weight starter. This "finishing" step allows for reduction of moderate molecular weight oligomers by providing sufficient reaction time for the last added low molecular weight starter to be oxyalkylated to a high molecular weight, thus minimizing polydispersity.

Although virtually any organic or inorganic acid may be used in the process of the present invention, useful acids include, but are not limited to, the mineral acids and the organic carboxylic acids, phosphonic acids, sulfonic acids, and other acids. Phosphoric acid is preferred as a mineral acid, whereas citric acid and 1,3,5-benzene tricarboxylic acids may be useful as organic acids. Acid derivatives which are reactive with bases, such as acid chlorides and acid anhydrides and the like, are also useful. Organic acids such as phosphonic acids, sulfonic acids, e.g., p-toluene-sulfonic acid, and the like, may also be used. Examples of mineral acids which are suitable include hydrochloric acid, hydrobromic acid, and sulfuric acid, among others, while useful carboxylic acids or their acidifying derivatives include formic acid, oxalic acid, citric acid, acetic acid, maleic acid, maleic anhydride, succinic acid, succinic anhydride, adipic acid, adipoyl chloride, adipic anhydride, and the like. Inorganic acid precursors such as thionyl chloride, phosphorous trichloride, carbonyl chloride, sulfur trioxide, thionyl chloride phosphorus pentoxide, phosphorous oxytrichloride, and the like are considered as mineral acids herein.

The amount of acid added in the inventive process is in excess of that needed for the mere neutralization of the glycerine, i.e., greater than 100 ppm, more preferably the amount of acid ranges from greater than 100 ppm to 2,000 ppm, and most preferably 200 ppm to 300 ppm. The acid may be added in the process of the present invention in an amount ranging between any combination of the above-recited values, inclusive of the recited values.

In the continuous version of the CAOS process, the reaction may be initiated by use of an oligomeric starter, but once begun is continuously initiated by further oligomeric starter, preferably by recycle of an oligomer or polymer from a later stage of the reaction. Alkylene oxide together with starter or low molecular weight oxyalkylation product is added at various points along the reactor which may, for example, be a tubular reactor ("multi-point addition"). A continuous stirred tank reactor (CSTR) or a back-mixed reactor may also be used.

The alkylene oxides useful in the inventive process include, but are not limited to, ethylene oxide, propylene oxide, oxetane, 1,2- and 2,3-butylene oxide, isobutylene oxide, epichlorohydrin, cyclohexene oxide, styrene oxide, and the higher alkylene oxides such as the $C_5$-$C_{30}$ α-alkylene oxides. Propylene oxide alone or mixtures of propylene oxide with ethylene oxide or another alkylene oxide are preferred. Other polymerizable monomers may be used as well, e.g., anhydrides and other monomers as disclosed in U.S. Pat. Nos. 3,404,109, 3,538,043 and 5,145,883, the contents of which are herein incorporated in their entireties by reference thereto.

The process of the present invention may employ any double metal cyanide (DMC) catalyst. Double metal cyanide complex catalysts are non-stoichiometric complexes of a low molecular weight organic complexing agent and optionally other complexing agents with a double metal cyanide salt, e.g. zinc hexacyanocobaltate. Suitable DMC catalysts are known to those skilled in the art. Exemplary DMC catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922, the contents of which are incorporated herein in their entireties by reference thereto. The DMC catalysts more preferred in the process of the present invention are those capable of preparing "ultra-low" unsaturation polyether polyols. Such catalysts are disclosed in U.S. Pat. Nos. 5,470,813 and 5,482,908, 5,545,601, 6,689,710 and U.S. Published Patent Application No. 2004-0044240-A1, the contents of which are herein incorporated in their entireties by reference thereto. Particularly preferred in the inventive process are those zinc hexacyanocobaltate catalysts prepared by the methods described in U.S. Pat. No. 5,482,908.

The DMC catalyst concentration is chosen so as to ensure good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.01 wt. %, based on the amount of polyether polyol to be produced. The DMC catalyst may be present in the process of the present invention in an amount ranging between any combination of these values, inclusive of the recited values.

EXAMPLES

The present invention is further illustrated, but is not to be limited, by the following examples. Although the inventive process is described below using glycerine as the starter, it is equally applicable to other low molecular weight starters which are synthesized, treated, or stored such that basic impurities which can cause DMC catalyst deactivation are present in the polyol, preferably starters having molecular weights below 300 Da, more preferably below 200 Da. The present invention can also be extended to those starters which do not contain basic impurities.

Comparative and excess acidified oxypropylations employing continuous addition of starter (CAOS) were performed in a 20 kg reactor. In each case, an amount of 700 Da molecular weight propoxylated glycerin starter sufficient to provide a build ratio of 8 was introduced to the reactor together with an amount of zinc hexacyanocobaltate complex DMC catalyst sufficient to provide a final catalyst concentration of 30 ppm in the final product. Commercial glycerin and propylene glycol were utilized.

Following addition of oligomeric starter and catalyst, the reactor was stripped with a nitrogen sparge at a pressure of 5 to 30 mm Hg for 30 to 40 minutes and a reactor temperature of 130° C. Propylene oxide was introduced in an amount equivalent to 4 to 6 weight percent of the starter charge and the reactor pressure monitored to ensure catalyst activation had occurred.

Pressure was allowed to drop below 500 torr prior to restarting the propylene oxide feed. Following activation, propylene oxide in a "red hot" build ratio was added to the reactor. The "red hot" build ratio is defined as the ratio of the amount of propylene oxide added plus the initial starter weight to the initial starter weight.

The "red hot" build ratio is necessary to ensure the catalyst is fully activated before the glycerin or propylene glycol is introduced. The first "red hot" build ratio refers to the build ratio when the propylene glycol is started. The propylene glycol fed at a weight ratio of 2.3 weight percent to the propylene oxide feed. The second "red hot build ratio refers to the start of the glycerin feed, at which point the glycerin was fed at a weight ratio of 17.1 percent to the propylene oxide. The co-feed of glycerin, propylene glycol and propylene oxide continued until the reactor contents reached 60 percent of the final batch weight (a 40% non-CAOS cap for propylene glycol). At this point, the propylene glycol feed was stopped, but glycerin and propylene oxide feeds continued. The co-feed of propylene glycol and propylene oxide continued until the reactor contents reached 90 percent of the final batch weight, at which point the glycerin feed was stopped (a 10% non-CAOS cap for glycerin). The propylene oxide feed was continued until the end of the batch. Reactor pressure was monitored throughout the batch, and if the pressure exceeded 45 psia, the propylene oxide and CAOS feeds were cut off.

In Comparative Example C1, the glycerin was acidified with 60 ppm of phosphoric acid. During this batch, the reactor pressure was 45 psia when the reactor contents reached 89 percent of the final batch weight, and the reactant feeds were shut down. Although 60 ppm of acid is more than enough to neutralize the basic contaminants measured in the glycerin, the peak pressure during this batch was 43% higher than was observed during the batch in which the glycerin was acidified to 240 ppm phosphoric acid (Example 2). The batch of Example 2 completed normally, reaching a maximum pressure of 32 psia. The presence of a significant excess of acid in Example 2 appears to have had a significant beneficial effect on catalyst activity.

The results of these examples are summarized below in Table I.

TABLE I

| | Ex. C1 | Ex. 2 |
|---|---|---|
| Target molecular weight (Da) | 700 | 700 |
| Target OH# (mg KOH/g) | 238 | 238 |
| Initial starter OH# (mg KOH/g) | 238 | 238 |
| Phosphoric acid concentration in glycerin (ppm) | 60 | 240 |
| PG "red hot" build ratio | 1.1 | 1.1 |

TABLE I-continued

|  | Ex. C1 | Ex. 2 |
| --- | --- | --- |
| Glycerin "red hot" build ratio | 1.25 | 1.25 |
| PG/Propylene oxide ratio during CAOS feed (%) | 2.3 | 2.3 |
| Glycerin/Propylene oxide ratio during CAOS feed (%) | 17.1 | 17.1 |
| Final catalyst concentration in product (ppm) | 30 | 30 |
| Reaction temperature (° C.) | 130 | 130 |
| Feed time (hours) | 6 | 6 |
| Overall build ratio | 8 | 8 |
| PG non-CAOS cap (%) | 40 | 40 |
| Glycerin non-CAOS cap (%) | 10 | 10 |
| Maximum pressure during batch (psia) | 46 (batch shut down) | 32 |

The term "establishing oxyalkylation conditions" in an oxyalkylation reactor is believed to be self-explanatory. Such conditions are established when the reactor temperature, alkylene oxide pressure, catalyst level, degree of catalyst activation, presence of oxyalkylatable compounds within the reactor, etc., are such that upon addition of unreacted alkylene oxide to the reactor, oxyalkylation takes place. As a non-limiting example, in the batch version of continuous addition of starter, oxyalkylation conditions are initially established by following the procedures detailed in the preceding examples. By the term "continuously introducing" with respect to addition of alkylene oxide and glycerine starter is meant truly continuous, or an incremental addition which provides substantially the same results as continuous addition of these components. By the term "oxyalkylated low molecular weight starter polyether" is meant a polyoxyalkylene polyether prepared by oxyalkylating the glycerine starter. The oxyalkylated glycerine starter polyether will be a polyoxypropylated, glycerine-initiated triol. The terms "starter" and "initiator" as used herein are the same unless otherwise indicated.

The polyether polyols produced by the process of the present invention may be reacted with one or more isocyanates to provide improved polyurethane products including, but not limited to, coatings, adhesives, sealants, elastomers, foams and the like.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for the polyoxyalkylation of a starter comprising:
    establishing oxyalkylation conditions in an oxyalkylation reactor in the presence of a double metal cyanide (DMC) catalyst;
    continuously introducing into the reactor at least one alkylene oxide and a low molecular weight starter acidified with at least one of an inorganic protic mineral acid and an organic acid, wherein the acid comprises greater than 100 ppm, based on the weight of the starter, wherein said low molecular weight starter is selected from the group consisting of glycerine, diglycerol, ethylene glycol, propylene glycol, trimethylolpropane, pentaerythritol, sorbitol, sucrose and mixtures thereof; and
    recovering an oxyalkylated low molecular weight polyether product having a number average molecular weight of about 250 Daltons to 700 Daltons.

2. The process according to claim 1, wherein the acid is chosen from mineral acids, organic carboxylic acids, phosphonic acids, sulfonic acids and combinations thereof.

3. The process according to claim 1, wherein the acid is chosen from citric acid, 1,3,5-benzene tricarboxylic acids, phosphonic acids, p-toluenesulfonic acid, hydrochloric acid, hydrobromic acid, sulfuric acid, formic acid, oxalic acid, citric acid, acetic acid, maleic acid, maleic anhydride, succinic acid, succinic anhydride, adipic acid, adipoyl chloride, adipic anhydride, thionyl chloride, phosphorous trichloride, carbonyl chloride, sulfur trioxide, thionyl chloride phosphorus pentoxide, phosphorous oxytrichloride and combinations thereof.

4. The process according to claim 1, wherein the acid is phosphoric acid.

5. The process according to claim 1, wherein the acid comprises greater than 100 ppm to about 2,000 ppm, based on the weight of the starter.

6. The process according to claim 1, wherein the acid comprises about 200 ppm to about 300 ppm, based on the weight of the starter.

7. The process according to claim 1, wherein the reactor is a continuous reactor.

8. The process according to claim 7, wherein the continuous reactor comprises a tubular reactor.

9. The process according to claim 7, wherein the step of continuously introducing the at least one alkylene oxide and the low molecular weight starter comprises multi-point addition.

10. The process according to claim 7, wherein the continuous reactor comprises a back-mixed reactor.

11. The process according to claim 1, wherein the DMC catalyst is a zinc hexacyanocobaltate.

12. The process according to claim 1, wherein the alkylene oxide is chosen from ethylene oxide, propylene oxide, oxetane, 1,2- and 2,3-butylene oxide, isobutylene oxide, epichlorohydrin, cyclohexene oxide, styrene oxide and $C_5$-$C_{30}$ α-alkylene oxides.

13. The process according to claim 1, wherein the alkylene oxide is propylene oxide.

14. The process according to claim 1, wherein the polyether product has a number average molecular weight of about 260 Daltons to 700 Daltons.

15. The process according to claim 1, wherein the process is continuous.

16. The process according to claim 1, wherein the process is semibatch.

17. The process according to claim 1, wherein the build ratio is from about 5 to 8.

* * * * *